United States Patent [19]

Baek

[11] Patent Number: 5,574,507

[45] Date of Patent: Nov. 12, 1996

[54] CIRCUIT AND METHOD FOR COMPENSATING FOR POSITION OF MAIN PICTURE

[75] Inventor: Woon G. Baek, Kyungsangbook-Do, Rep. of Korea

[73] Assignee: Goldstar Co., Ltd., Seoul, Rep. of Korea

[21] Appl. No.: 238,882

[22] Filed: May 6, 1994

[30] Foreign Application Priority Data

May 8, 1993 [KR] Rep. of Korea ............... 7927/1993

[51] Int. Cl.$^6$ .............. H04N 5/45; H04N 3/227
[52] U.S. Cl. ............ 348/511; 348/567; 348/568
[58] Field of Search ............... 348/511, 567, 348/566, 568, 704, 904, 588, 582, 563, 564, 565, 586; H04N 5/445, 3/227

[56] References Cited

U.S. PATENT DOCUMENTS

| | | | |
|---|---|---|---|
| 5,237,417 | 8/1993 | Hayashi et al. | 348/565 |
| 5,285,284 | 2/1994 | Takashima et al. | 348/565 |
| 5,331,349 | 7/1994 | Kim | 348/567 |
| 5,365,278 | 11/1994 | Willis | 348/588 |
| 5,369,444 | 11/1994 | Ersoz et al. | 348/567 |
| 5,452,012 | 9/1995 | Saitoh | 348/564 |
| 5,453,796 | 9/1995 | Duffield et al. | 348/565 |

FOREIGN PATENT DOCUMENTS 5145865   6/1993   Japan .

*Primary Examiner*—John K. Peng
*Assistant Examiner*—Jeffrey S. Murrell

[57] ABSTRACT

A method and apparatus for compensating for a position of a main picture displayed on a display screen of a display includes a sub-picture processor, a chroma processor and a display controller. The sub-picture processor receives an intermediate frequency signal of a sub-picture, and produces a sub-picture video signal of a predetermined aspect ratio from the intermediate frequency signal. The chroma processor receives a main picture video signal representing the main picture, and the sub-picture video signal. The chroma processor generates a composite video signal from the main picture video signal and the sub-picture video signal, and outputs the composite video signal to the display. The display controller controls the sub-picture processor and the display such that the main picture and the sub-picture are displayed on the display screen with a position of the main picture shifted on the display screen in a first mode of operation.

39 Claims, 7 Drawing Sheets

(CONVENTIONAL ART)

(CONVENTIONAL ART)

CIRCUIT AND METHOD FOR COMPENSATING FOR POSITION OF MAIN PICTURE

BACKGROUND OF THE INVENTION

1. Field of the Invention

The present invention relates, in general, to the compensation of a position of a main picture being displayed on a screen of a monitor of a television receiver (referred to hereinafter as TV), and more particularly to a circuit and a method for compensating for the position of the main picture in which the main picture and a sub-picture are displayed on the adjacent portions of the screen in a picture-in-picture (referred to hereinafter as PIP) mode, respectively, as if in a picture-out-picture (referred to hereinafter as POP) mode.

2. Description of the Prior Art

Referring to FIG. 1, there is shown a block diagram of a conventional video processing circuit for a TV. As shown in this drawing, the conventional video processing circuit comprises a sub-picture intermediate frequency (referred to hereinafter as IF) processor 1 for separating a sub-picture video signal SA and a sub-picture synchronous signal SB from an IF signal SIF of a sub-picture inputted therein, and a sub-picture video processor 2 for analog/digital-converting the sub-picture video signal SA from the sub-picture IF processor 1, reducing an aspect ratio of the digitized sub-picture video signal, digital/analog-converting the digitized sub-picture video signal of the reduced aspect ratio and applying the resultant sub-picture video signal to a chroma circuit 6.

An on-screen display (referred to hereinafter as OSD) signal generator 3 is adapted to generate OSD color signals Ro, Go and Bo in response to a control signal from a microcomputer 5.

The microcomputer 5 is adapted to generate the control signal and control data in response to a key input signal from a key matrix unit 4, and output the control signal and the control data to the OSD signal generator 3 and the sub-picture video processor 2, respectively. The control data from the microcomputer 5 is information regarding vertical and horizontal positions of the sub-picture to display together with a main picture on a screen of a color picture tube (referred to hereinafter as CPT) 7.

The chroma circuit 6 is adapted to switch an external main picture video signal SC, the sub-picture video signal from the sub-picture video processor 2 and the OSD color signals Ro, Go and Bo from the OSD signal generator 3 to output a composite picture video signal to the CPT 7. Also, the chroma circuit 6 separates main picture vertical and horizontal synchronous signals VS and HS from the main picture video signal SC and outputs the separated main picture vertical and horizontal synchronous signals VS and HS to the sub-picture video processor 2 as signal SD.

A deflection controller 8 is adapted to generate horizontal and vertical deflection control currents in response to the main picture horizontal and vertical synchronous signals HS and VS, and output the generated horizontal and vertical deflection control currents to the CPT 7 to control a beam scanning direction of the CPT 7 for the display of the output from the chroma circuit 6 on the screen of the CPT 7.

The operation of the conventional video processing circuit with the above-mentioned construction will hereinafter be described.

Upon selection of a PIP-ON key on the key matrix unit 4 by the user, a corresponding signal is applied to the microcomputer 5. Then, the microcomputer 5 recognizes the PIP-ON key signal inputted therein, and outputs the control data regarding the vertical and horizontal positions of the sub-picture to display on the screen of the CPT 7 to the sub-picture video processor 2. In response to the control data from the microcomputer 5, the sub-picture video processor 2 analog/digital-converts the sub-picture video signal SA from the sub-picture IF processor 1, reduces the aspect ratio of the digitized sub-picture video signal, digital/analog-converts the digitized sub-picture video signal of the reduced aspect ratio and applies the resultant sub-picture video signal to the chroma circuit 6.

The chroma circuit 6 receives the main picture video signal SC, the sub-picture video signal from the sub-picture video processor 2 and the OSD color signals Ro, Go and Bo from the OSD signal generator 3, and outputs the composite picture video signal to the CPT 7 for the display thereon.

The deflection controller 8 generates the horizontal and vertical deflection control currents in response to the main picture horizontal and vertical synchronous signals HS and VS, and outputs the generated horizontal and vertical deflection control currents to the CPT 7. As a result, the beam scanning direction of the CPT 7 is controlled by the horizontal and vertical deflection control currents from the deflection controller 8, thereby causing the composite picture video signal from the chroma circuit 6 to be displayed on the screen of the CPT 7.

On the other hand, the sub-picture video processor 2 receives, serially, the sub-picture display vertical and horizontal data from the microcomputer 5. Then, the sub-picture video processor 2 counts the received sub-picture display horizontal and vertical data synchronously with the main picture horizontal and vertical synchronous signals HS and VS from the chroma circuit 6. As a result of the counting, the sub-picture video processor 2 outputs the sub-picture video signal to the chroma circuit 6. Therefore, the sub-picture is displayed in the position on the screen of the CPT 7 corresponding to the sub-picture display vertical and horizontal data from the microcomputer 5.

In the case where the PIP-ON key is selected by the user, the sub-picture is displayed on the screen, being superimposed on a part of the main picture. For this reason, the main picture is partially hidden by the sub-picture on the screen in a PIP mode as shown in FIG. 5A. To solve this problem, the main and sub-pictures can be displayed on the left and right portions of the screen in a POP mode as shown in FIG. 5B, respectively. However, in this case, a right edge portion of the main picture is hidden by the sub-picture. As a result, the center of the main picture appears shifted to the right on the screen.

SUMMARY OF THE INVENTION

Therefore, the present invention has been made in view of the above problem, and it is an object of the present invention to provide a circuit and a method for compensating for a position of a main picture, in which the center of the main picture is moved closer to the other side of the screen a screen and a sub-picture is displayed on the side of the moved main picture closer to the other side of the screen in a PIP mode, so that the main picture can be viewed more efficiently by the user.

In accordance with one aspect of the present invention, there is provided a circuit for compensating for a position of a main picture, comprising sub-picture intermediate frequency processing means for separating a sub-picture video signal and a sub-picture synchronous signal from an intermediate frequency signal of a sub-picture inputted therein; sub-picture video processing means for analog/digital-converting the sub-picture video signal from said sub-picture intermediate frequency processing means, reducing an aspect ratio of the digitized sub-picture video signal and digital/analog-converting the digitized sub-picture video signal of the reduced aspect ratio, on-screen display signal generation means for generating on-screen display color signals in response to a first control signal; system control means for generating the first control signal, a second control signal and control data in response to a key input signal from a key matrix unit and outputting the first control signal and the control data to said on-screen display signal generation means and said sub-picture video processing means, respectively, said control data from said system control means being information regarding vertical and horizontal positions of the sub-picture to displayed together with the main picture on a screen of a color picture tube; chroma means for switching an external main picture video signal, the sub-picture video signal from said sub-picture video processing means and the on-screen display color signals from said on-screen display signal generation means to output a composite picture video signal to said color picture tube; deflection control means for generating horizontal and vertical deflection control currents in response to main picture horizontal and vertical synchronous signals inputted therein and outputting the generated horizontal and vertical deflection control currents to said color picture tube to control a beam scanning direction thereof; memory means for storing sub-picture delay data and on-screen display region delay data and outputting the stored data in a pseudo picture-out-picture mode; and horizontal synchronous signal switching means for delaying the main picture horizontal synchronous signal in response to the second control signal from said system control means and outputting the delayed main picture horizontal synchronous signal to said deflection control means in a picture-in-picture mode.

In accordance with another aspect of the present invention, there is provided a method of compensating for a position of a main picture, comprising the steps of (a) checking whether a picture-in-picture ON key signal from a key matrix unit is inputted; (b) setting one of a plurality of picture-in-picture modes if it is checked at said step (a) that the picture-in-picture ON key signal is inputted and discriminating the set picture-in-picture mode; (c) discriminating a previously set picture-in-picture mode if it is checked at said step (a) that the picture-in-picture ON key signal is not inputted, (d) setting data such that a plurality of sub-pictures are displayed in a pseudo picture-out-picture mode, if the picture-in-picture mode discriminated at said step (b) or (c) is the pseudo picture-out-picture mode; (e) reading sub-picture horizontal delay data and on-screen display region horizontal delay data from a memory; (f) setting sub-picture horizontal position data and on-screen display region horizontal position data on the basis of the read sub-picture horizontal delay data and on-screen display region horizontal delay data, respectively, and outputting the set sub-picture horizontal position data and on-screen display region horizontal position data to a sub-picture video processor and an on-screen display signal generator, respectively; (g) delaying a main picture horizontal synchronous signal for a predetermined time period and outputting the delayed main picture horizontal synchronous signal to a deflection controller; (h) setting data such that a single sub-picture is displayed in a picture-in-picture ON mode, if the picture-in-picture mode discriminated at said step (b) or (c) is the picture-in-picture ON mode; (i) setting the sub-picture horizontal position data and the on-screen display region horizontal position data if the data is set at said step (h) and outputting the set sub-picture horizontal position data and on-screen display region horizontal position data to said sub-picture video processor and said on-screen display signal generator, respectively; (j) outputting the main picture horizontal synchronous signal to said deflection controller with no delay; (k) setting data such that a picture-in-picture OFF mode is performed, if the picture-in-picture mode discriminated at said step (b) or (c) is the picture-in-picture OFF mode, and (l) repeatedly performing said steps (i) and (j) if the data is set at said step (k).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
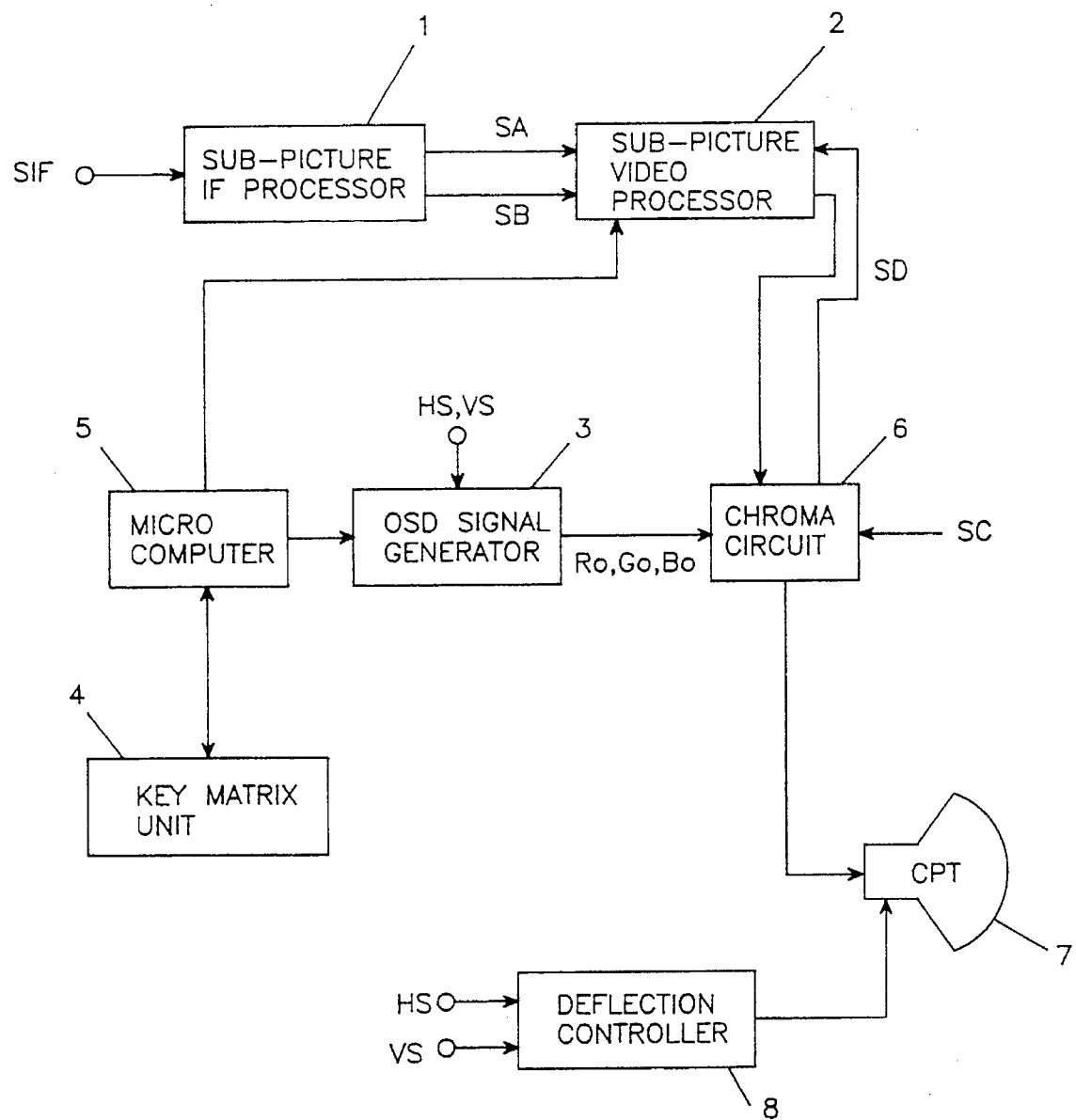
FIG. 1 is a block diagram of a conventional video processing circuit for a TV.
Figure 2:
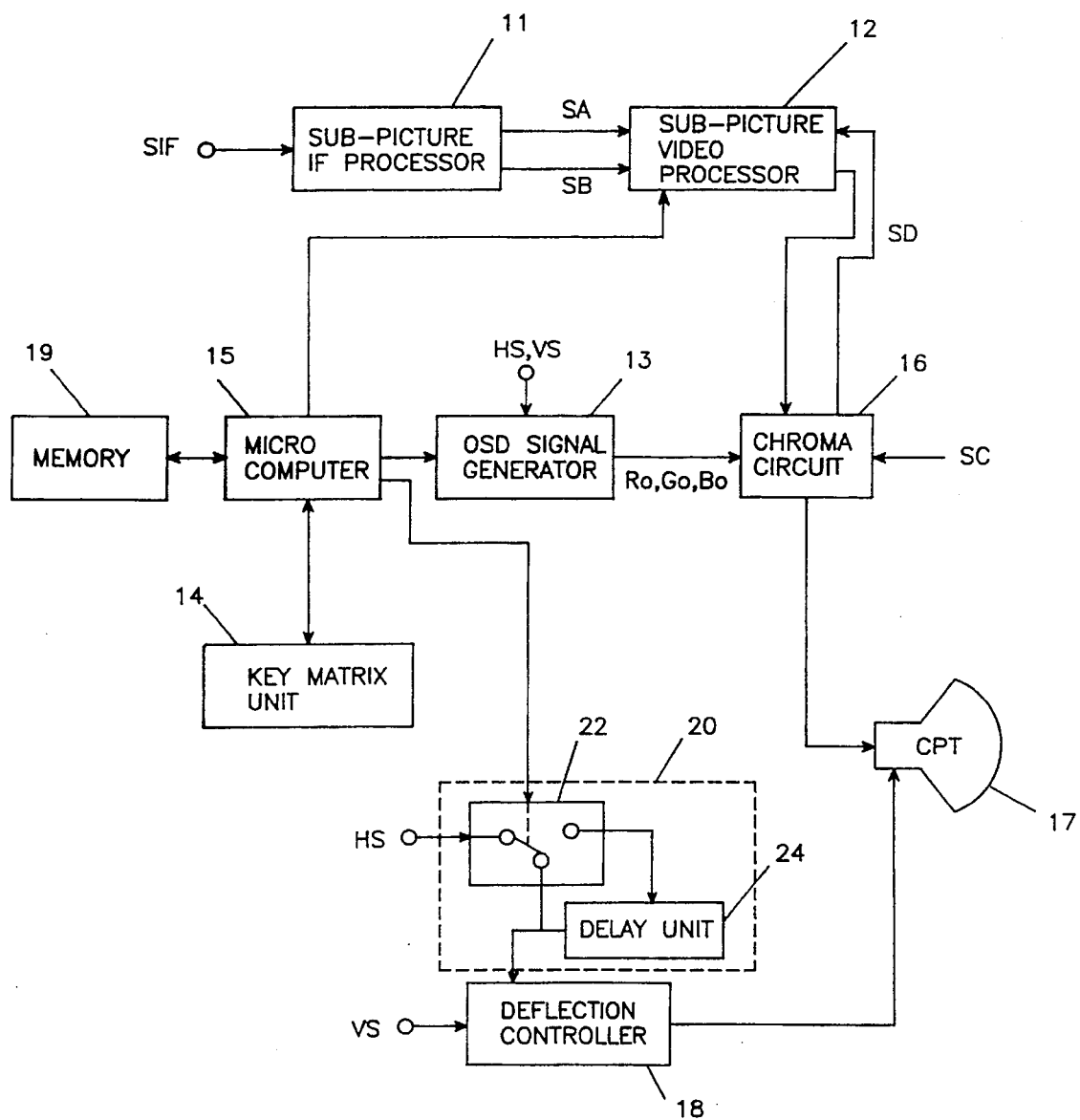
FIG. 2 is a block diagram of a circuit for compensating for a position of a main picture in accordance with the present invention.

Referring to FIG. 2, there is shown a block diagram of a circuit for compensating for a position of a main picture in accordance with the present invention. As shown in this drawing, the main picture position compensation circuit comprises a sub-picture IF processor 11 for separating a sub-picture video signal SA and a sub-picture synchronous signal SB from an IF signal SIF of a sub-picture inputted therein, a sub-picture video processor 12 for analog/digital-converting the sub-picture video signal SA from the sub-picture IF processor 11, reducing an aspect ratio of the digitized sub-picture video signal, digital/analog-converting the digitized sub-picture video signal of the reduced aspect ratio and applying the resultant sub-picture video signal to a chroma circuit 16, and an OSD signal generator 13 for generating OSD color signals Ro, Go and Bo in response to a first control signal from a microcomputer 15.

The microcomputer 15 is adapted to generate the first control signal and control data in response to a key input signal from a key matrix unit 14 and output the first control signal and the control data to the OSD signal generator 13 and the sub-picture video processor 12, respectively. The control data from the microcomputer 15 is information regarding vertical and horizontal positions of the sub-picture to displayed together with the main picture on a screen of a CPT 17.

The chroma circuit 16 is adapted to switch an external main picture video signal SC, the sub-picture video signal from the sub-picture video processor 12 and the OSD color signals Ro, Go and Bo from the OSD signal generator 13 to output a composite picture video signal to the CPT 17.

A deflection controller 18 is adapted to generate horizontal and vertical deflection control currents in response to main picture horizontal and vertical synchronous signals HS and VS inputted therein, and output the generated horizontal and vertical deflection control currents to the CPT 17 to control a beam scanning direction of the CPT 17 for the display of the output from the chroma circuit 16 on the screen of the CPT 17.

A memory 19 is adapted to store sub-picture delay data and OSD region delay data, and output the stored data in a pseudo POP mode.

A horizontal synchronous signal switching circuit 20 is adapted to delay the main picture horizontal synchronous signal HS in response to a second control signal from the microcomputer 15.

The horizontal synchronous signal switching circuit 20 includes a delay element 24 for delaying the main picture horizontal synchronous signal HS for a predetermined time period and outputting the delayed main picture horizontal synchronous signal HS to the deflection controller 18, and a switch 22 for transferring the main picture horizontal synchronous signal HS to the deflection controller 18 or the delay element 24 in response to the second control signal from the microcomputer 15.

Figure 3:
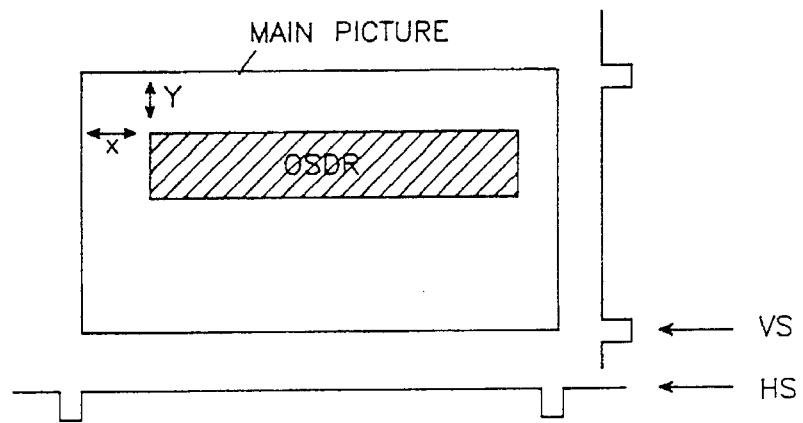
FIG. 3 is a view illustrating main picture vertical and horizontal synchronous signals and an OSD region on the main picture in accordance with the present invention.
Figure 6:
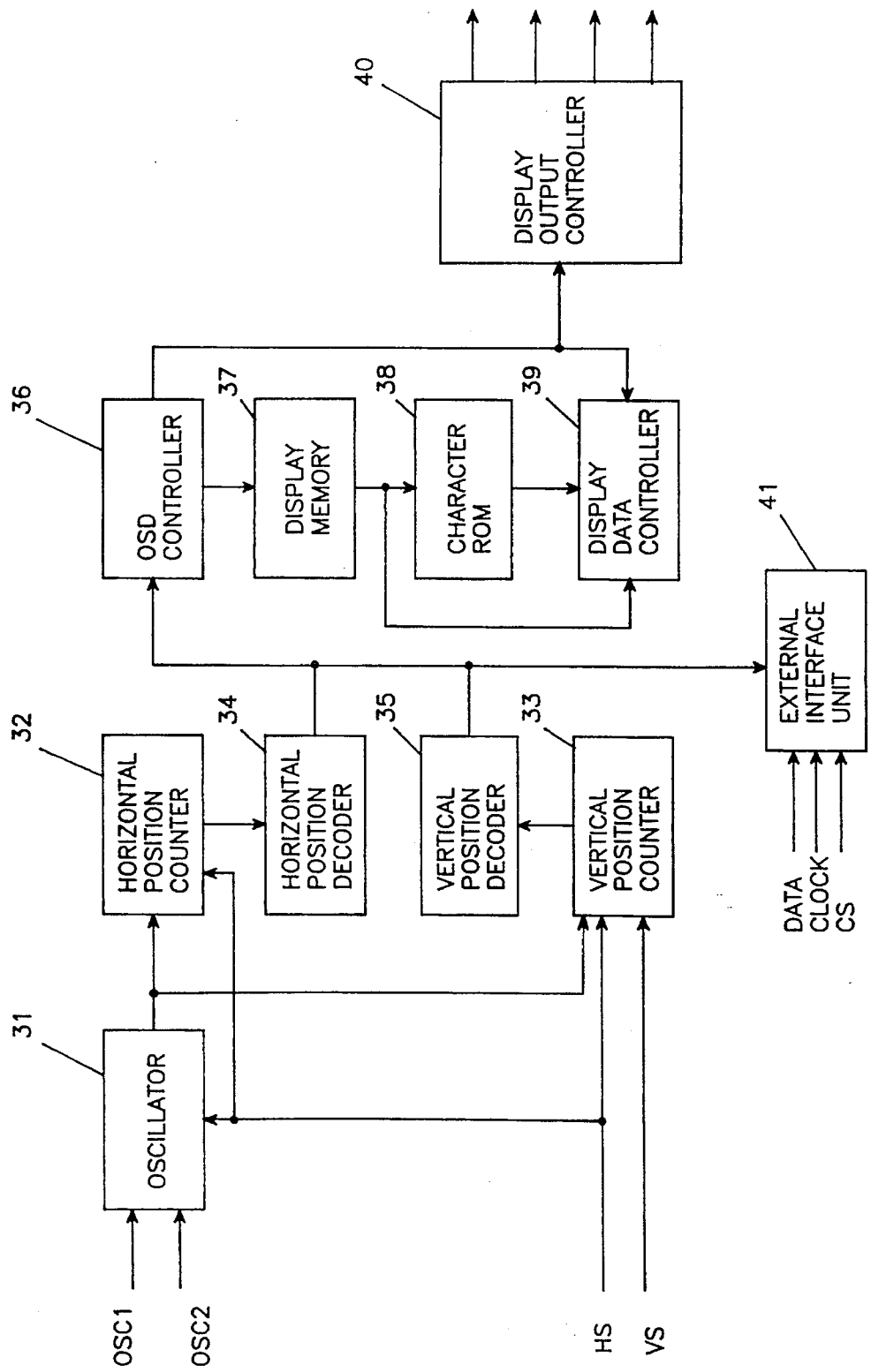
FIG. 6 is a detailed block diagram of an OSD signal generator in FIG. 2.

Referring to FIG. 6, there is shown a detailed block diagram of the OSD signal generator 13. As shown in this drawing, the OSD signal generator 13 includes an oscillator 31 for inputting oscillating signals OSC1 and OSC2 and outputting a clock signal for the horizontal position counter 32 and the vertical position counter 33. As the clock signal is applied from the oscillator 31, the horizontal position counter 32 counts the horizontal synchronous signal HS to detect a horizontal position data. Also, the vertical position counter 33 counts the horizontal synchronous signal HS and the vertical synchronous signal VS to detect a vertical position data based on the clock signal applied from the oscillator 31. Horizontal and vertical position decoders 34 and 35, respectively, decode the counted values from the horizontal and vertical position counters 32 and 33 to output horizontal and vertical position data X and Y of an OSD region OSDR on the main picture as shown in FIG. 3 to an OSD controller 36, respectively.

The OSD controller 36 is adapted to read address data from a display memory 37 in response to the horizontal and vertical position data X and Y from the horizontal and vertical position decoders 34 and 35.

Also, the OSD signal generator 13 includes a character read only memory (referred to hereinafter as ROM) 38 for outputting character data from its location corresponding to the read address data from the display memory 37, and a display data controller 39 for outputting the character data from the character ROM 38 and color data from the display memory 37 through a display output controller 40.

Figure 7:
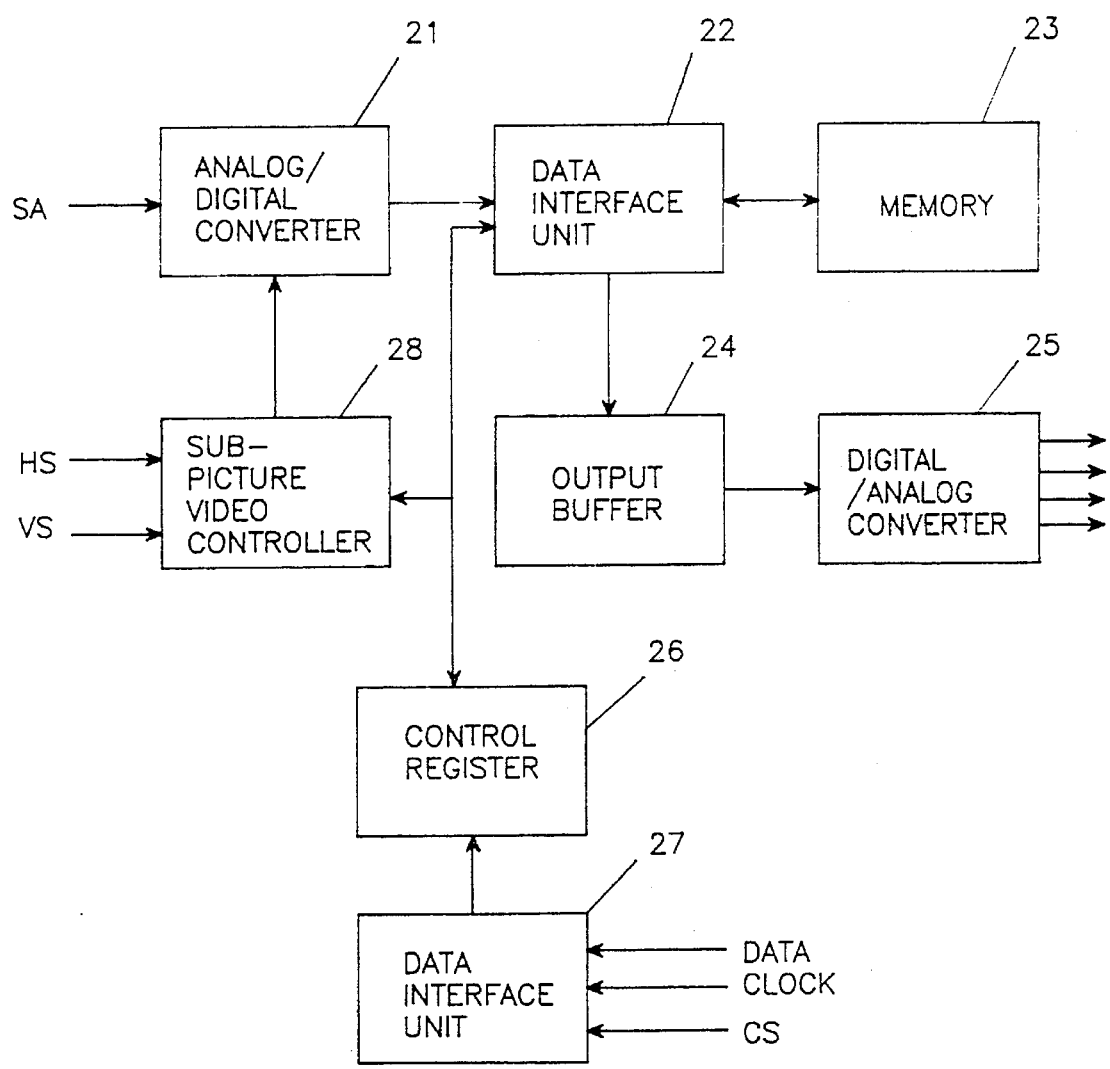
FIG. 7 is a detailed block diagram of a sub-picture video processor in FIG. 2.

Referring to FIG. 7, there is shown a detailed block diagram of the sub-picture video processor 12. As shown in this drawing, the sub-picture video processor 12 includes an analog/digital converter 21 for converting the sub-picture video signal SA from the sub-picture IF processor 11 into the digital sub-picture video signal. The digital sub-picture video signal from the analog/digital converter 21 is written into a memory 23 through a data interface unit 22.

Also, the sub-picture video processor 12 includes a digital/analog converter 25 for receiving the digital sub-picture video signal from the memory 23 through the data interface unit 22 and an output buffer 24 and for converting the received digital sub-picture video signal into the analog sub-picture video signal for the display on the screen, a data interface unit 27 for serially receiving the control data from the microcomputer 15, a control register 26 for storing temporarily the control data received through the data interface unit 27, and a sub-picture video controller 28 for controlling the data flow through the data interface unit 22 synchronously with the main picture vertical and horizontal synchronous signals VS and HS and in response to the control data from the control register 26.

The operation of the main picture position compensation circuit with the above-mentioned construction in accordance with the present invention will hereinafter be described in detail.

First, upon selection of a PIP-ON key on the key matrix unit 14 by the user, a corresponding signal is applied to the microcomputer 15. Then, the microcomputer 15 recognizes the PIP-ON key signal inputted therein, and outputs the control data regarding the vertical and horizontal positions of the sub-picture to display on the screen of the CPT 17 to the sub-picture video processor 12.

In response to the control data from the microcomputer 15, the sub-picture video processor 12 analog/digital-converts the sub-picture video signal SA from the sub-picture IF processor 11, reduces the aspect ratio of the digitized sub-picture video signal, digital/analog-converts the digitized sub-picture video signal of the reduced aspect ratio and applies the resultant sub-picture video signal to the chroma circuit 16. The operation of the sub-picture video processor 12 will hereinafter be mentioned in more detail with reference to FIG. 7.

The sub-picture video controller 28 outputs a control signal to the analog/digital converter 21 to control horizontal and vertical synchronizations of the sub-picture video signal SA in response to the main picture vertical and horizontal synchronous signals VS and HS. In response to the control signal from the sub-picture video controller 28, the analog/digital converter 21 converts the analog sub-picture video signal SA into the digital sub-picture video signal, which is then stored into the memory 23 through the data interface unit 22. Then, in the case where the sub-picture display is to be executed, the digital sub-picture video signal stored in the memory 23 is applied to the digital/analog converter 25 through the data interface unit 22 and the output buffer 24. The digital/analog converter 25 converts the received digital sub-picture video signal into the analog sub-picture video signal and outputs the analog sub-picture video signal to the chroma circuit 16.

Noticeably, the sub-picture video signal SA is reduced in its aspect ratio while being passed from the analog/digital converter 21 to the digital/analog converter 25. Also, the processing of the sub-picture video signal SA is performed synchronously with the main picture vertical and horizontal synchronous signals VS and HS and in response to the control data from the control register 26.

On the other hand, the operation of the OSD signal generator 13 is performed under the control of the microcomputer 15, as will hereinafter be described in more detail with reference to FIG. 6.

The horizontal and vertical position counters 32 and 33 count the output from the oscillator 31 and output the counted values to the horizontal and vertical position decoders 34 and 35, respectively. The horizontal and vertical position decoders 34 and 35 decode the counted values from the horizontal and vertical position counters 32 and 33, respectively. As a result of the decoding, the horizontal and vertical position decoders 34 and 35 output the horizontal and vertical position data X and Y of the OSD region OSDR to the OSD controller 36, respectively. The OSD controller 36 reads from the display memory 37 the address data corresponding to the horizontal and vertical position data X and Y to enable the on-screen display in a position corresponding to the position data.

Then, the character ROM 38 outputs the character data from its location corresponding to the read address data from the display memory 37. The character data from the character ROM 38 and the color data from the display memory 37 are outputted through the display output controller 40 under the control of the display data controller 39. As a result, the on-screen display is performed.

The display output controller 40 outputs the OSD color signals Ro, Go and Bo so that the on-screen display can be performed in the position corresponding to the horizontal and vertical position data X and Y of the OSD region OSDR as shown in FIG. 3. At this time, the microcomputer 15 applies, serially, the control data regarding the position, color and character type of the OSD region through an external interface unit 41.

Upon receiving the main picture video signal SC, the sub-picture video signal from the sub-picture video processor 12 and the OSD color signals Ro, Go and Bo from the OSD signal generator 13, the chroma circuit 16 selects first the OSD color signals Ro, Go and Bo and then the sub-picture video signal. In this manner, the composite picture video signal is to be displayed on the screen of the CPT 17.

As mentioned previously, in the case where the main and sub-pictures are displayed in the PIP and POP-modes, the main picture is partially hidden by the sub-picture. To solve this problem, the microcomputer 15 reads the sub-picture delay data and the OSD region delay data stored in the memory 19, and then sets the sub-picture horizontal position data and OSD region horizontal position data on the basis of the read sub-picture delay data and OSD region delay data. Then, the microcomputer 15 controls the switch 22 of the horizontal synchronous signal switching circuit 20 to transfer the main picture horizontal synchronous signal HS to the delay element 24.

Figure 5A:
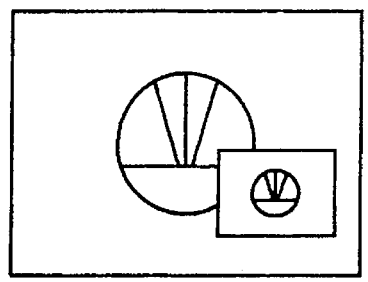
FIGS. 5A through 5D are views illustrating display states of main and sub-pictures on a screen in PIP and POP modes in accordance with the present invention, respectively.
Figure 5B:
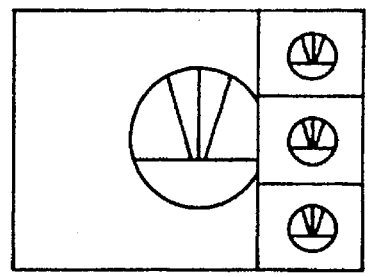
Figure 5C:
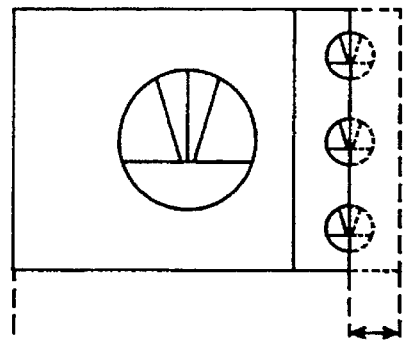

Subsequently, the main picture horizontal synchronous signal HS is delayed for the predetermined time period by the delay element 24 and then applied to the deflection controller 18. This results in a delay in a horizontal scanning line. Hence, the main picture is displayed being moved to the left on the screen of the CPT 17 as shown in FIG. 5C. Namely, the OSD and sub-picture horizontal positions are delayed to the right on the screen of the CPT 17 and the deflection thereof is performed beginning with the left of the screen. In effect, the center of the main picture is moved to the left on the screen and three sub-pictures are displayed on the right edge portion of the screen. This has the effect of performing the POP mode with the PIP mode.

Figure 4:
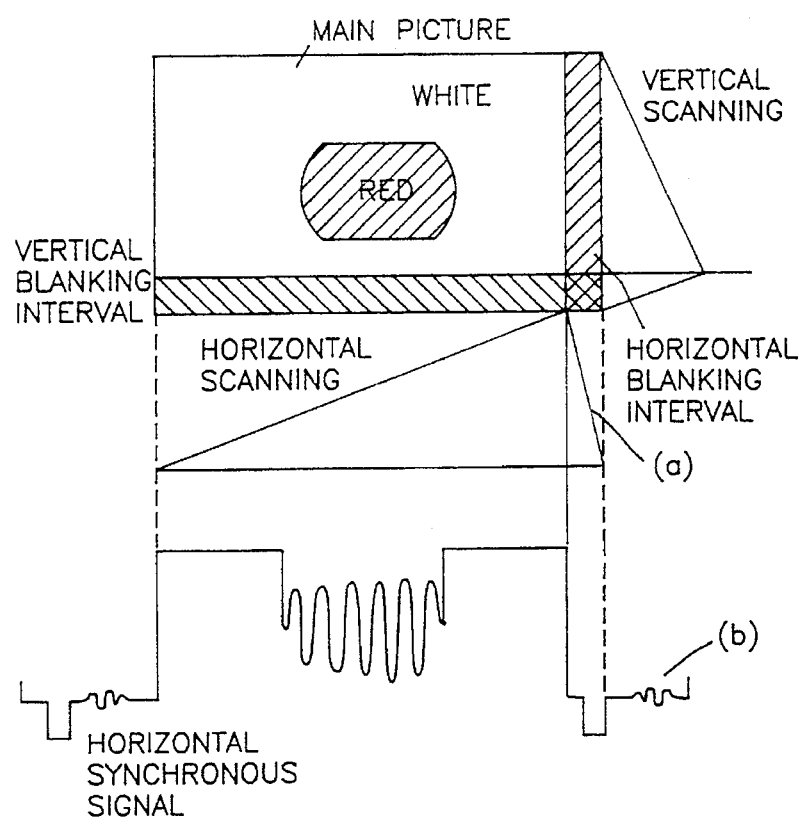
FIG. 4 is a view illustrating a display state on a screen and vertical and horizontal scanning lines in accordance with the present invention.

In other words, if the main picture horizontal synchronous signal HS is delayed by the horizontal synchronous signal switching circuit 20 as shown by the reference numeral b in FIG. 4, the horizontal scanning line is thus delayed as shown by the reference numeral b in FIG. 4. As a result, the main picture is pulled to the left on the screen as shown in FIG. 5C, thereby allowing the user to view it conveniently.

Figure 5D:
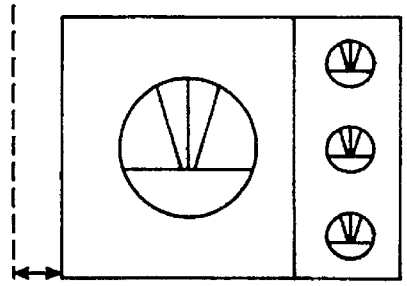

Therefore, the deflection controller 18 generates the horizontal and vertical deflection control currents in response to the main picture vertical synchronous signal VS and the main picture horizontal synchronous signal HS delayed by the horizontal synchronous signal switching circuit 20, and outputs the generated horizontal and vertical deflection control currents to the CPT 17, thereby to control the beam scanning direction of the CPT 17. Therefore, the main picture is well-balanced as shown in FIG. 5D.

Figure 8:
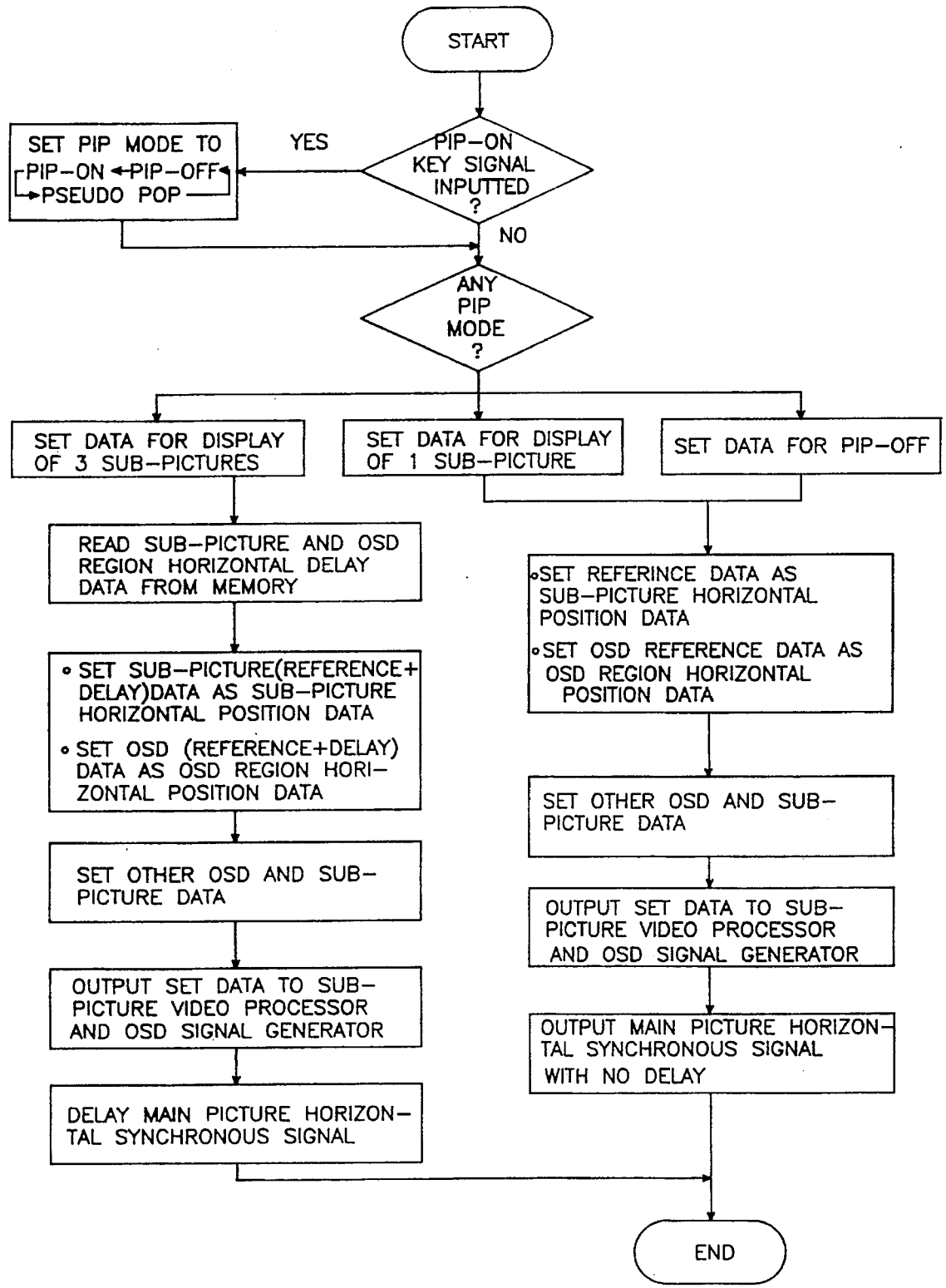
FIG. 8 is a flowchart illustrating a method of compensating for the position of the main picture in accordance with the present invention.

Referring to FIG. 8, there is shown a flowchart illustrating a method of compensating for the position of the main picture in accordance with the present invention. At the first step, the microcomputer 15 checks whether the PIP-ON key signal from the key matrix unit 14 is inputted. If it is checked at the first step that the PIP-ON key signal from the key matrix unit 14 is inputted, the microcomputer 15 proceeds to the second step of setting the PIP mode to PIP-ON mode→pseudo POP mode→PIP-OFF mode. When the PIP mode is set at the second step or the PIP-ON key signal from the key matrix unit 14 is not inputted at the first step, the set or previously set PIP mode is discriminated at the third step.

If it is discriminated at the third step that the PIP mode is the pseudo POP mode, data is set such that three sub-pictures are displayed in the pseudo POP mode, at the fourth step. Then, the microcomputer 15 reads the sub-picture horizontal delay data and the OSD region horizontal delay data stored in the memory 19. The microcomputer 15 adds sub-picture reference horizontal data to the read sub-picture horizontal delay data and sets the added data as the sub-picture horizontal position data. Also, the microcomputer 15 adds OSD region reference horizontal data to the read OSD region horizontal delay data and sets the added data as the OSD region horizontal position data. Then, the microcomputer 15 outputs the set sub-picture horizontal position data and the set OSD region horizontal position data to the sub-picture video processor 12 and the OSD signal generator 13, respectively.

Then, at the fifth step, the microcomputer 15 outputs a high signal to the switch 22 of the horizontal synchronous signal switching circuit 20 to transfer the main picture horizontal synchronous signal HS to the delay element 24. As a result, the main picture horizontal synchronous signal HS is delayed for a predetermined time period by the delay element 24, and then applied to the deflection controller 18. Therefore, the main and sub-pictures are displayed in the pseudo POP mode.

On the other hand, if it is discriminated at the third step that the PIP mode is the PIP-ON mode, data is set such that a single sub-picture is displayed in the PIP-ON mode, at the sixth step. Also, if it is discriminated at the third step that the PIP mode is the PIP-OFF mode, data is set such that the PIP mode is turned off. Then, the microcomputer 15 sets the sub-picture reference horizontal data as the sub-picture horizontal position data. Also, the microcomputer 15 sets the OSD region reference horizontal data as the OSD region horizontal position data. Then, the microcomputer 15 outputs the set sub-picture horizontal position data and the set OSD region horizontal position data to the sub-picture video processor 12 and the OSD signal generator 13, respectively.

Then, at the seventh step, the microcomputer 15 outputs a low signal to the switch 22 of the horizontal synchronous signal switching circuit 20 to transfer the main picture horizontal synchronous signal HS to the deflection controller 18. As a result, the main picture horizontal synchronous signal HS is not delayed, thereby causing the main and sub-pictures to be normally displayed in the PIP-ON mode.

With the above-mentioned sequential steps, the horizontal deflection is controlled in the pseudo POP mode so that the main picture and the OSD image can be pulled to the left on the screen. Therefore, the horizontal positions of the main picture and OSD image can be compensated for.

As apparent from the above description, according to the present invention, the center of the main picture is moved to the left on the screen and the sub-picture is displayed on the right side of the moved main picture in the PIP mode. Therefore, the main picture can be viewed more efficiently by the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for compensating for a position of a main picture, comprising:

sub-picture intermediate frequency processing means for separating a sub-picture video signal and a sub-picture synchronous signal from an intermediate frequency signal of a sub-picture inputted therein;

sub-picture video processing means for analog/digital-converting the sub-picture video signal from said sub-picture intermediate frequency processing means, reducing an aspect ratio of the digitized sub-picture video signal and digital/analog-converting the digitized sub-picture video signal of the reduced aspect ratio;

on-screen display signal generation means for generating on-screen display color signals in response to a first control signal;

system control means for generating the first control signal, a second control signal and control data in response to a key input signal from a key matrix unit and outputting the first control signal and the control data to said on-screen display signal generation means and said sub-picture video processing means, respectively, said first control signal being generated based on on-screen display region delay data in a pseudo picture-out-picture mode, said control data from said system control means being information regarding vertical and horizontal positions of the sub-picture to display together with the main picture on a screen of a color picture tube, said control data being generated based on sub-picture delay data in said pseudo picture-out-picture mode;

chroma means for switching an external main picture video signal, the sub-picture video signal from said sub-picture video processing means and the on-screen display color signals from said on-screen display signal generation means to output a composite picture video signal to said color picture tube;

deflection control means for generating horizontal and vertical deflection control currents in response to main picture horizontal and vertical synchronous signals inputted therein and outputting the generated horizontal and vertical deflection control currents to said color picture tube to control a beam scanning direction thereof;

memory means for storing said sub-picture delay data and said on-screen display region delay data and outputting the stored data to said system control means in said pseudo picture-out-picture mode; and horizontal synchronous signal switching means for delaying the main picture horizontal synchronous signal in response to the second control signal from said system control means and outputting the delayed main picture horizontal synchronous signal to said deflection control means in said pseudo picture-out-picture mode.

2. A circuit for compensating for a position of a main picture, as set forth in claim 1, wherein said horizontal synchronous signal switching means includes:

a delay element for delaying the main picture horizontal synchronous signal for a predetermined time period and outputting the delayed main picture horizontal synchronous signal to said deflection control means; and a switch for transferring the main picture horizontal synchronous signal to said deflection control means or said delay element in response to the second control signal from said system control means.

3. A circuit for compensating for a position of a main picture, as set forth in claim 2, wherein said switch transfers the main picture horizontal synchronous signal to said delay element when the second control signal from said system control means is high in level.

4. A circuit for compensating for a position of a main picture, as set forth in claim 2, wherein said switch transfers the main picture horizontal synchronous signal to said deflection control means when the second control signal from said system control means is low in level.

5. A method of compensating for a position of a main picture, comprising the steps of:

(a) checking whether a picture-in-picture ON key signal from a key matrix unit is inputted;

(b) setting one of a plurality of picture-in-picture modes if it is checked at said step (a) that the picture-in-picture ON key signal is inputted and discriminating the set picture-in-picture mode;

(c) discriminating a previously set picture-in-picture mode if it is checked at said step (a) that the picture-in-picture ON key signal is not inputted;

(d) setting first data such that a plurality of sub-pictures are displayed in a pseudo picture-out-picture mode, if the picture-in-picture mode discriminated at said step (b) or (c) is the pseudo picture-out-picture mode;

(e) reading sub-picture horizontal delay data and on-screen display region horizontal delay data from a memory;

(f) setting first sub-picture horizontal position data and first on-screen display region horizontal position data on the basis of the read sub-picture horizontal delay data and the read on-screen display region horizontal delay data, respectively, if said step (d) sets said first data, and outputting the set first sub-picture horizontal position data and first on-screen display region horizontal position data to a sub-picture video processor and an on-screen display signal generator, respectively;

(g) delaying a main picture horizontal synchronous signal for a predetermined time period and outputting the delayed main picture horizontal synchronous signal to a deflection controller;

(h) setting second data such that a single sub-picture is displayed in a picture-in-picture ON mode, if the picture-in-picture mode discriminated at said step (b) or (c) is the picture-in-picture ON mode;

(i) setting second sub-picture horizontal position data and second on-screen display region horizontal position data if said second data is set at said step (h) and outputting the set second sub-picture horizontal position data and the second on-screen display region horizontal position data to said sub-picture video processor and said on-screen display signal generator, respectively;

(j) outputting the main picture horizontal synchronous signal to said deflection controller with no delay;

(k) setting third data such that a picture-in-picture OFF mode is performed, if the picture-in-picture mode discriminated at said step (b) or (c) is the picture-in-picture OFF mode; and (l) repeatedly performing said steps (i) and (j) if the third data is set at said step (k).

6. A method of compensating for a position of a main picture, as set forth in claim 5, wherein said plurality of picture-in-picture modes are three.

7. A method of compensating for a position of a main picture, as set forth in claim 6, wherein said plurality of picture-in-picture modes are the picture-in-picture ON mode, the pseudo picture-out-picture mode and the picture-in-picture OFF mode.

8. A method of compensating for a position of a main picture, as set forth in claim 5, wherein said step (f) includes the step of adding sub-picture reference horizontal data to the read sub-picture horizontal delay data and setting the added data as the first sub-picture horizontal position data.

9. A method of compensating for a position of a main picture, as set forth in claim 5, wherein said step (f) includes the step of adding on-screen display region reference horizontal data to the read on-screen display region horizontal delay data and setting the added data as the first on-screen display region horizontal position data.

10. A method of compensating for a position of a main picture, as set forth in claim 5, wherein in said step (g) the main picture horizontal synchronous signal is delayed for the predetermined time period in response to a high control signal and then applied to said deflection controller.

11. A method of compensating for a position of a main picture, as set forth in claim 5, wherein said step (i) includes the step of setting on-screen display region reference horizontal data as the second on-screen display region horizontal position data.

12. A method of compensating for a position of a main picture, as set forth in claim 5, wherein said step (i) includes the step of setting sub-picture reference horizontal data as the second sub-picture horizontal position data.

13. A method of compensating for a position of a main picture, as set forth in claim 5, wherein in said step (j) the main picture horizontal synchronous signal is applied to said deflection controller with no delay in response to a low control signal.

14. An apparatus for compensating for a position of a main picture displayed on a display screen of a display, comprising:

sub-picture producing means for receiving an intermediate frequency signal of a sub-picture, and for producing a sub-picture video signal of a predetermined aspect ratio from said intermediate frequency signal;

chroma means for receiving a main picture video signal representing said main picture, and said sub-picture video signal, for generating a composite video signal from said main picture video signal and said sub-picture video signal, and for outputting said composite video signal to said display; and display control means for controlling said display such that said main picture and said sub-picture are displayed on said display screen with a position of said main picture shifted on said display screen in a first mode of operation.

15. The apparatus of claim 14, wherein said sub-picture producing means produces said sub-picture video signal based on control data; and said display control means generates and outputs said control data to said sub-picture producing means, said control data being information regarding vertical and horizontal positions of said sub-picture to be displayed on said display screen.

16. The apparatus of claim 14, further comprising:

on-screen display signal generation means for generating on-screen display color signals in response to a first control signal; and wherein said chroma means receives said on-screen display color signals, and generates said composite video signal from said main picture video signal, said sub-picture video signal, and said on-screen display color signals; and said display control means generates said first control signal in response to operation of an input key on an input device.

17. The apparatus of claim 14, wherein said display control means controls said sub-picture producing means and said display such that said sub-picture is displayed at least twice on said display screen.

18. The apparatus of claim 14, wherein said first mode of operation is a pseudo picture-out-picture mode.

19. The apparatus of claim 14, wherein said display control means controls said sub-picture producing means and said display such that said main picture and said sub-picture are displayed on said display screen without a position of said main picture being shifted on said display screen in at least a second mode of operation.

20. The apparatus of claim 19, wherein said first mode of operation is a pseudo picture-out-picture mode, and said second mode of operation is a picture-in-picture mode.

21. An apparatus for compensating for a position of a main picture displayed on a display screen of a display, comprising:

sub-picture producing means for receiving an intermediate frequency signal of a sub-picture, and for producing a sub-picture video signal of a predetermined aspect ratio from said intermediate frequency signal;

chroma means for receiving a main picture video signal representing said main picture, and said sub-picture video signal, for generating a composite video signal from said main picture video signal and said sub-picture video signal, and for outputting said composite video signal to said display; and display control means for controlling said display such that said main picture and said sub-picture are displayed on said display screen with a position of said main picture shifted on said display screen in a first mode of operation;

wherein said display control means includes:

deflection control means for generating horizontal and vertical deflection control currents in response to main picture horizontal and vertical synchronous signal input therein, and for outputting said horizontal and vertical deflection control currents to said display to control a beam scanning direction thereof; and horizontal synchronous signal switch means for delaying a main picture horizontal synchronous signal and outputting said delayed main picture horizontal synchronous signal to said deflection control means in said first mode of operation.

22. An apparatus for compensating for a position of a main picture displayed on a display screen of a display, comprising:

sub-picture producing means for receiving an intermediate frequency signal of a sub-picture, and for producing a sub-picture video signal of a predetermined aspect ratio from said intermediate frequency signal;

chroma means for receiving a main picture video signal representing said main picture, and said sub-picture video signal, for generating a composite video signal from said main picture video signal and said sub-picture video signal, and for outputting said composite video signal to said display; and display control means for controlling said display such that said main picture and said sub-picture are displayed on said display screen with a position of said main picture shifted on said display screen in a first mode of operation;

wherein said sub-picture producing means produces said sub-picture video signal based on control data;

wherein said display control means generates and outputs said control data to said sub-picture producing means, said control data being information regarding vertical and horizontal positions of said sub-picture to be displayed on said display screen; and wherein said display control means includes:
deflection control means for generating horizontal and vertical deflection control currents in response to main picture horizontal and vertical synchronous signal input therein, and for outputting said horizontal and vertical deflection control currents to said display to control a beam scanning direction thereof;
a memory storing sub-picture delay data;
horizontal synchronous signal switch means for delaying a main picture horizontal synchronous signal and outputting said delayed main picture horizontal synchronous signal to said deflection control means in said first mode of operation; and
control means for reading said sub-picture data from said memory and for generating said control data based on said sub-picture delay data in said first mode of operation.

23. The apparatus of claim 22, further comprising:
on-screen display signal generation means for generating on-screen display color signals in response to a first control signal; and wherein
said chroma means receives said on-screen display color signals, and generates said composite video signal from said main picture video signal, said sub-picture video signal, and said on-screen display color signals; and
said display control means generates said first control signal in response to operation of an input key on an input device.

24. The apparatus of claim 23, wherein
said memory stores on-screen display region horizontal delay data; and
said control means reads said on-screen display region horizontal delay data from said memory and generates said first control signal based on said on-screen display region horizontal delay data in said first mode of operation.

25. An apparatus for compensating for a position of a main picture displayed on a display screen of a display, comprising:

sub-picture producing means for receiving an intermediate frequency signal of a sub-picture, and for producing a sub-picture video signal of a predetermined aspect ratio from said intermediate frequency signal;

chroma means for receiving a main picture video signal representing said main picture, and said picture video signal, for generating a composite video signal from said main picture video signal and said sub-picture video signal, and for outputting said composite video signal to said display;

display control means for controlling said display such that said main picture and said sub-picture are displayed on said display screen with a position of said main picture shifted on said display screen in a first mode of operation; and on-screen display signal generation means for generating on-screen display color signals in response to a first control signal; and wherein wherein said chroma means receives said on-screen display color signals, and generates said composite video signal from said main picture video signal, said sub-picture video signal, and said on-screen display color signals;

wherein said display control means generates said first control signal in response to operation of an input key on an input device; and wherein said display control means includes:
deflection control means for generating horizontal and vertical deflection control currents in response to main picture horizontal and vertical synchronous signal input therein, and for outputting said horizontal and vertical deflection control currents to said display to control a beam scanning direction thereof;
a memory storing on-screen display region horizontal delay data;
horizontal synchronous signal switch means for delaying a main picture horizontal synchronous signal and outputting said delayed main picture horizontal synchronous signal to said deflection control means in said first mode of operation; and
control means for reading said on-screen display region horizontal delay data from said memory and for generating said first control signal based on said on-screen display region horizontal delay data in said first mode of operation.

26. An apparatus for compensating for a position of a main picture displayed on a display screen of a display, comprising:

sub-picture producing means for receiving an intermediate frequency signal of a sub-picture, and for producing a sub-picture video signal of a predetermined aspect ratio from said intermediate frequency signal;

chroma means for receiving a main picture video signal representing said main picture, and said sub-picture video signal, for generating a composite video signal from said main picture video signal and said sub-picture video signal, and for outputting said composite video signal to said display; and display control means for controlling said display such that said main picture and said sub-picture are displayed on said display screen with a position of said main picture shifted on said display screen in a first mode of operation;

wherein said display control means includes:
delay means for delaying said horizontal synchronous signal for a predetermined period of time; and switch means for outputting one of said horizontal synchronous signal and said delayed horizontal synchronous signal, said switch means outputting said delayed horizontal synchronous signal when in said first mode of operation.

27. A method for compensating for a position of a main picture displayed on a display screen of a display, comprising:

(a) receiving a main picture signal representing said main picture and an intermediate frequency signal representing a sub-picture;

(b) producing a sub-picture video signal of a predetermined aspect ratio from said intermediate frequency signal;

(c) generating a composite video signal from said main picture video signal and said sub-picture video signal;

(d) outputting said composite video signal to said display; and (e) controlling said display such that said main picture and said sub-picture are displayed on said display screen with a position of said main picture shifted on said display screen in a first mode of operation.

28. The method of claim 27, wherein
said step (b) produces said sub-picture video signal based on control data; and
said step (e) generates and outputs said control data to said sub-picture producing means, said control data being information regarding vertical and horizontal positions of said sub-picture to be displayed on said display screen.

29. The method of claim 27, further comprising:

(f) generating on-screen display color signals in response to a first control signal; and wherein step (c) generates said composite video signal from said main picture video signal, said sub-picture video signal, and said on-screen display color signals; and said step (e) generates said first control signal in response to operation of an input key on an input device.

30. The method of claim 28, wherein said step (e) controls said step (b) and display such that said sub-picture is displayed at least twice on said display screen.

31. The method of claim 27, wherein said first mode of operation is a pseudo picture-out-picture mode.

32. The method of claim 27, wherein said step (e) controls said step (b) and said display such that said main picture and said sub-picture are displayed on said display screen without a position of said main picture being shifted on said display screen in at least a second mode of operation.

33. The method of claim 32, wherein said first mode of operation is a pseudo picture-out-picture mode, and said second mode of operation is a picture-in-picture mode.

34. A method for compensating for a position of a main picture displayed on a display screen of a display, comprising:

(a) receiving a main picture signal representing said main picture and an intermediate frequency signal representing a sub-picture;

(b) producing a sub-picture video signal of a predetermined aspect ratio from said intermediate frequency signal;

(c) generating a composite video signal from said main picture video signal and said sub-picture video signal;

(d) outputting said composite video signal to said display; and (e) controlling said display such that said main picture and said sub-picture are displayed on said display screen with a position of said main picture shifted on said display screen in a first mode of operation;

wherein said step (e) includes:

(e1) generating horizontal and vertical deflection control currents in response to main picture horizontal and vertical synchronous signal input therein;

(e2) outputting said horizontal and vertical deflection control currents to said display to control a beam scanning direction thereof;

(e3) delaying a main picture horizontal synchronous signal; and (e4) outputting said delayed main picture horizontal synchronous signal to said deflection control means in said first mode of operation.

35. A method for compensating for a position of a main picture displayed on a display screen of a display, comprising:

(a) receiving a main picture signal representing said main picture and an intermediate frequency signal representing a sub-picture;

(b) producing a sub-picture video signal of predetermined aspect ratio from said intermediate frequency signal;

(c) generating a composite video signal from said main picture video signal and said sub-picture video signal;

(d) outputting said composite video signal to said display; and (e) controlling said display such that said picture and said sub-picture are displayed on said display screen with a position of said main picture shifted on said display screen in a first mode of operation;

wherein said step (b) produces said sub-picture video signal based on control data;

wherein said step (e) generates and outputs said control data to said sub-picture producing means, said control data being information regarding vertical and horizontal positions of said sub-picture to be displayed on said display screen; and wherein said step (e) includes:

(e1) generating horizontal and vertical deflection control currents in response to main picture horizontal and vertical synchronous signal input therein;

(e2) outputting said horizontal and vertical deflection control currents to said display to control a beam scanning direction thereof;

(e3) storing sub-picture delay data;

(e4) delaying a main picture horizontal synchronous signal;

(e5) outputting said delayed main picture horizontal synchronous signal to said deflection control means in said first mode of operation; and (e6) generating said control data based on said stored sub-picture delay data in said first mode of operation.

36. The method of claim 35, further comprising:

(f) generating on-screen display color signals in response to a first control signal; and wherein step (c) generates said composite video signal from said main picture video signal, said sub-picture video signal, and said on-screen display color signals; and said step (e) generates said first control signal in response to operation of an input key on an input device.

37. The method of claim 36, wherein said step (e) further comprises:

(e7) storing on-screen display region horizontal delay data;

(e8) generating said first control signal based on said stored on-screen display region horizontal delay data in said first mode of operation.

38. A method for compensating for a position of a main picture displayed on a display screen of a display, comprising:

(a) receiving a main picture signal representing said main picture and an intermediate frequency signal representing a sub-picture;

(b) producing a sub-picture video signal of a predetermined aspect ratio from said intermediate frequency signal;

(c) generating a composite video signal from said main picture video signal and said sub-picture video signal;

(d) outputting said composite video signal said display;

(e) controlling said display such that said main picture and said sub-picture are displayed on said display screen with a position of said main picture shifted on said display screen in a first mode of operation; and (f) generating on-screen display color signals in response to a first control signal;

wherein step (c) generates said composite video signal from said main picture video signal, said sub-picture video signal, and said on-screen display color signals;

wherein said step (e) generates said first control signal in response to operation of an input key on an input device; and wherein said step (e) includes:

(e1) generating horizontal and vertical deflection control currents in response to main picture horizontal and vertical synchronous signal input therein;

(e2) outputting said horizontal and vertical deflection control currents to said display to control a beam scanning direction thereof;

(e3) storing on-screen display region horizontal delay data;

(e4) delaying a main picture horizontal synchronous signal;

(e5) outputting said delayed main picture horizontal synchronous signal to said deflection control means in said first mode of operation; and (e6) generating said first control signal based on said stored on-screen display region horizontal delay data in said first mode of operation,

39. A method for compensating for a position of a main picture displayed on a display screen of a display, comprising:

(a) receiving a main picture signal representing said main picture and an intermediate frequency signal representing a sub-picture;

(b) producing a sub-picture video signal of a predetermined aspect ratio from said intermediate frequency signal;

(c) generating a composite video signal form said main picture video signal and said sub-picture video signal;

(d) outputting said composite video signal to said display; and (e) controlling said display such that said main picture and said sub-picture are displayed on said display screen with a position of said main picture shifted on said display screen in a first mode of operation;

wherein said step (e) includes:

(e1) delaying said horizontal synchronous signal for a predetermined period of time; and (e2) outputting one of said horizontal synchronous signal and said delayed horizontal synchronous signal, said step (e2) outputting said delayed horizontal synchronous signal when in said first mode of operation.

\* \* \* \* \*